March 1, 1960 D. A. WEIR ET AL 2,926,851

BINARY ADDER-SUBTRACTER

Filed Dec. 7, 1953 3 Sheets-Sheet 1

INVENTORS.
DONALD A. WEIR
JOSEPH RICE

BY Robert Harding Jr.

ATTORNEY

BINARY ADDER-SUBTRACTER

Filed Dec. 7, 1953 3 Sheets-Sheet 2

Inventor
DONALD A. WEIR -
JOSEPH RICE
By R.K. Morris
Attorney

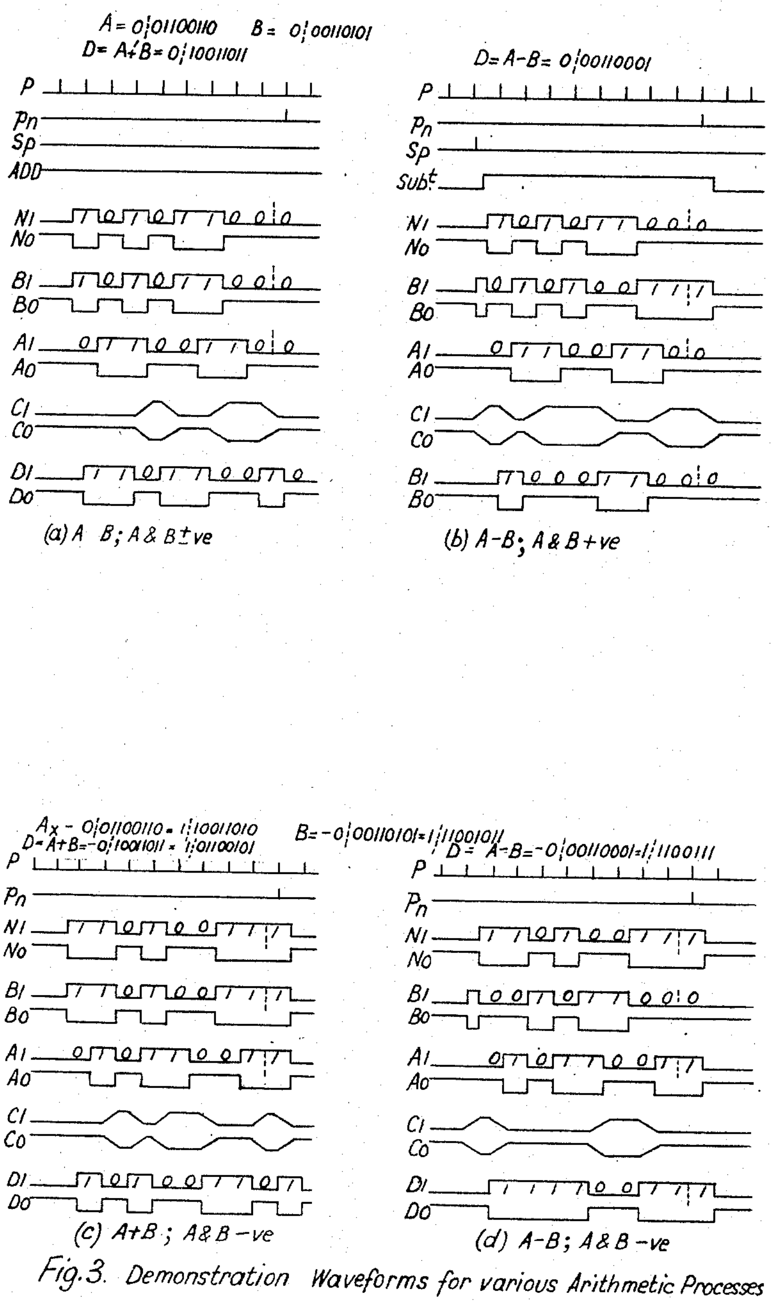
(a) A B; A & B ± ve (b) A−B; A & B +ve (c) A+B; A & B −ve (d) A−B; A & B −ve
Fig. 3. Demonstration Waveforms for various Arithmetic Processes
Inventor
DONALD A. WEIR-
JOSEPH RICE
By [signature]
Attorney 2,926,851

BINARY ADDER-SUBTRACTER

Donald Adams Weir and Joseph Rice, London, England, assignors to International Standard Electric Corporation, New York, N.Y.

Application December 7, 1953, Serial No. 396,564

Claims priority, application Great Britain December 9, 1952

4 Claims. (Cl. 235—176)

The present invention relates to electrical calculating circuits, and especially to an electrical circuit for performing binary arithmetical operation.

According to the present invention there is provided an electrical adding circuit which comprises a pair of channels over which a first number is received, a second pair of channels over which a second number to be added to said first number is received, which numbers are expressed in binary digital code and are received digit by digit with the least significant digit first, the first channel of a pair of channels being energised if the digit momently being received over that pair of channels is 1 and the second channel of a pair of channels being energised if the digit momently being received over that pair of channels is 0, and means responsive to reception of said two numbers to add said second number to said first number.

According to the present invention there is further provided an electrical adding circuit which comprises a pair of channels over which a first number is received, a second pair of channels over which a second number to be added to said first number is received, which numbers are expressed in binary digital code and are received digit-by-digit with the least significant digit first, the first channel of a pair of channels being energised if the digit momently being received over that pair of channels is 1 and the second channel of a pair of channels being energised if the digit momently being received over that pair of channels is 0, a two-condition device which is normally in its first condition, first control means responsive to the simultaneous energisation of the first channels of both of said pairs of channels to cause said two-condition device to assume or remain in its second condition, means responsive to said two-condition device being in its second condition in response to the digits in one digital place to cause "carry" to the next digital place of the numbers being added, and second control means responsive to the simultaneous energisation of the second channels of both of said pairs of channels to cause said two-condition device to return to or remain in its first condition wherein no "carry" is caused, whereby as soon as "carry" is required said two-condition device assumes its second condition in which it remains until the first subsequent digital place from which no "carry" is necessary.

Figure 1:
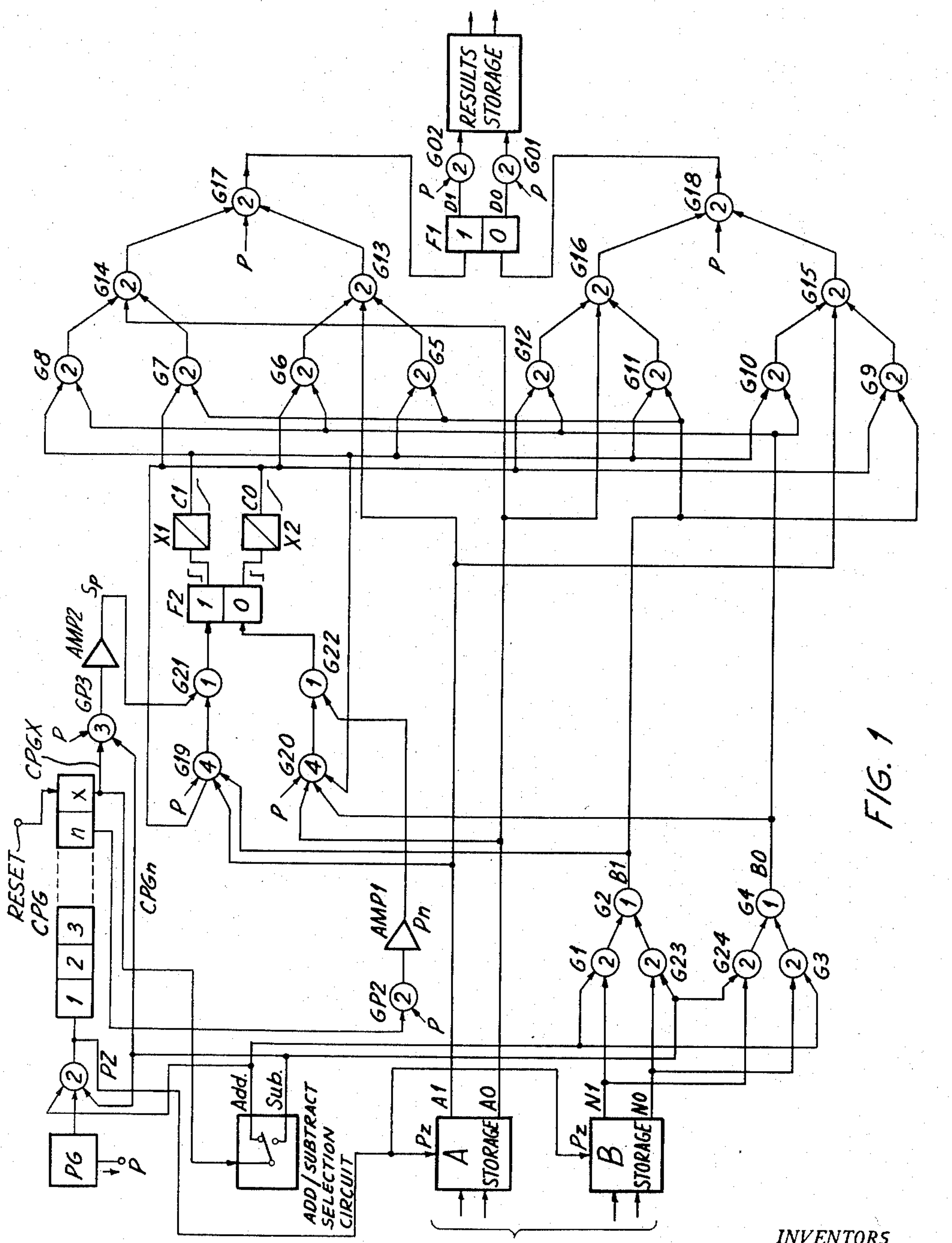

The invention will now be described with reference to the accompanying drawings, in which:

Fig. 1 is a functional schematic circuit of an embodiment of the present invention.

Figure 2A:
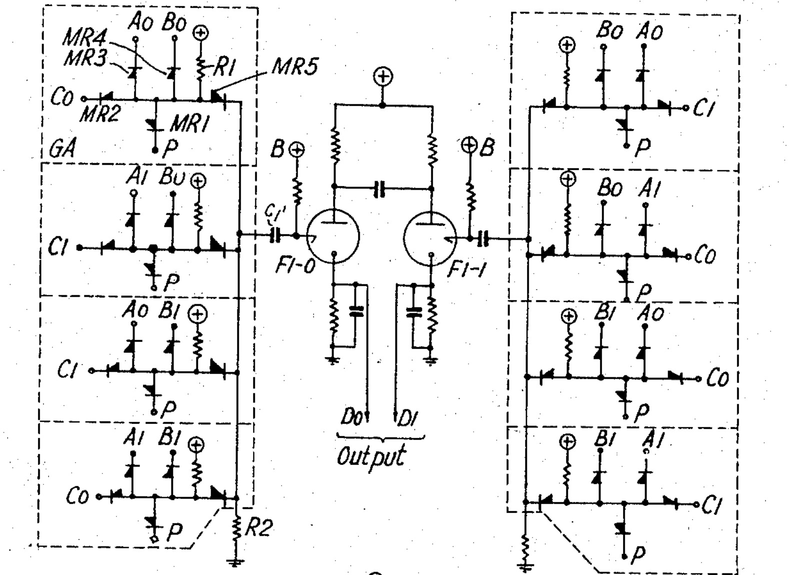
Figure 2B:
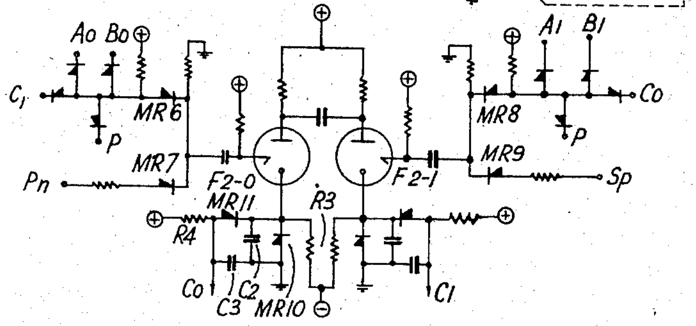
Figure 2C:
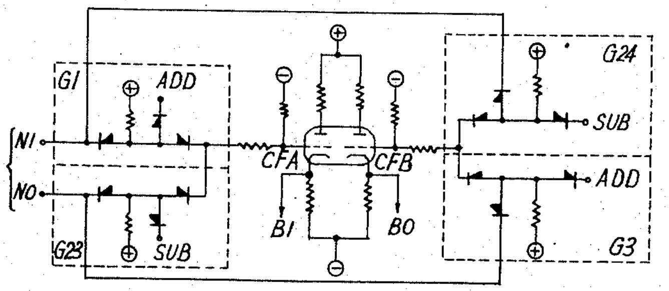

Figs. 2*a*, 2*b*, and 2*c* show practical forms of the circuits shown schematically in Fig. 1.

Fig. 3 shows waveforms encountered in the circuit of Figs. 1 and 2*a*, 2*b*, 2*c* during four typical arithmetical operations.

The embodiment of the invention shown is what is known as a serial adder, that is, it is an adding circuit which adds two numbers A and B together, the digit trains representing the two numbers being presented to the circuit in synchronism. The least significant digit place is dealt with first.

When binary numbers have to be expressed with an indication of the sign of the numbers, the highest digital place is used for the sign. If the number is positive, this place is occupied by 0, e.g. 0/00110101 is +53 (1+4+16+32), while if the number is negative, this place is occupied by 1, e.g. 1/01100101, which is −101 (1+4+32+64). When it is desired to subtract a number it is usual to form the complement of the number, for instance, if it is desired to subtract 53 we produce the complement 1/11001011. The 1 before the oblique stroke shows that the number is to be treated as a negative number. In the equipment to be described the complement is formed by reversing all digits, i.e. 53 becomes 1/11001010, which is 1 too small. This 1, the so-called "fugitive one" is dealt with by producing an extra "carry" in the first digital place. As will be seen, this gives the same result as does adding in the true complement.

*Functional circuit (Fig. 1)*

The two numbers to be treated are assumed to be stored in two separate storage devices "A" and "B." These could be pattern movement registers, magnetic drums, delay-line storage devices, or any other storage devices. The numbers to be treated will have been previously supplied to the A storage and the B storage from an input circuit over the leads shown on the left-hand ends of these storage devices. The numbers are stored in binary notation, and there are two output leads from each storage device. Of these leads, the upper lead assumes a positive potential when the digit momently being received by the adder from the storage is "one" and assumes earth potential when that digit is "zero." The lead marked "0" assumes a positive potential when the digit momently being received by the adder from the storage is "zero" and assumes earth potential when that digit is "one." The outputs to the circuit from "A" storage are marked "A1" and "A0," of which A1 is at a positive potential when the digit from A is 1 and A0 outputs from B storage marked "N1" and "N0" go to a set of gates which will be described later. Thus the numbers which are supplied to the adder are received as two-wire signals, thus reducing the risk of a faulty addition due to a lost pulse.

Gates are represented functionally by circles, in each of which is inscribed a numeral. This indicates how many of the controls for that gate must be simultaneously energised for the gate to deliver an output. Also shown in Fig. 1 are two flip-flop circuits of the bistable type each of these being represented by a pair of contiguous rectangles. Inputs to the flip-flops are shown on the upper side thereof, and outputs on the lower side. The flip-flop outputs of F2 each extends to a waveform changer, shown as a square, bisected diagonally, the input and output waveforms being shown adjacent the input and output leads respectively. It will be seen that the output from the adder, as well as the input thereto, is two-wire.

In the present arrangement it is assumed that the adder is never called on to do a calculation whose answer would be a number having more digits than the associated equipment can deal with. Where the longest number which can be dealt with has $(n-1)$ digits, the $n$th place being reserved for the sign digit, the maximum of a summation is $2^n-1$. This ensures that when adding two positive numbers there will never be a "carry" into the sign digit position.

The control marked "Add" are energised by a positive potential signal by well-known means shown as an Add/Subtract selection circuit and, when the circuit is intended to do a subtraction the controls marked "Sub" are energised. This causes the inversion described above. When the adder forms part of a computer, the Add/Subtract circuit performs its functions under the control of the program equipment.

Pulses P are derived from an external pulse generator PG which can be of any well-known type, and are so timed that the pulses each coincide approximately with the centre of an elemental time period during which potentials are applied to the various gate inputs, ensuring that conditions on the input leads are stabilised before any examination is made. Pulse P*n*, indicated as emanating from the circuit connected to the *n*th output of the counter CPG, coincides with the P pulse which examines the *n*th element, presumed to be the sign digit as already described. Pulse S*p* is a pulse which is always generated by the amplifier AMP2 if the next arithmetic operation is to be subtraction and is preferably produced in response to the signal given to the add-subtract selection circuit equipment which energises the Sub leads.

The generator PG emits pulses P, which pulses are also supplied to gate BP1, which can be opened to pass P pulses to a pulse counter CPG, which has $(n+1)$ positions. The last position CPGX is a rest position to which the counter is always restored by a Reset signal, as shown. The reset signal may be produced by a source, not shown, and delivered at the very beginning of any operation to be sure the equipment is in its rest position before the operation starts. It forms no part of the present invention. The opening of GP1 is effected by a pulse P and an energisation of either the Sub or the Add input to GP1 which persists for a period equal to that needed for $(n+1)$ pulses. This energisation is supplied from the Add/Subtraction selection circuit and is removed under control of CPGX, as shown schematically.

When counted CPG reaches its *n*th position, gate GP2 is opened to pass a P pulse which, via an amplifier AMP1, if needed, becomes pulse P*n*. If a subtraction is to be performed, when the Sub leads are energised, the first P pulse opens GP3 to produce, via amplifier AMP2 if needed, a pulse S*p*. This P pulse, of course, steps the counter to CPG1.

To ensure that the synchronism which we have referred to above is adequately maintained, both A and B storages receive P pulses on lead PZ, this being an output from GP1.

There is no risk of a spurious S*p* pulse, since as soon as CPG reaches CPGX, the Sub control is eliminated, hence disabling GP1.

*Addition of two binary numbers*

For the purpose of this explanation it will be assumed that the sign digit occupies the sixth digital place, i.e. that $n=6$.

The initial condition is with F1 set so the F1.0 is operated, i.e. discharging in the case of a flip-flop using tubes, and F2 set with F2.0 operated. This condition is indicated in Fig. 1 by asterisks adjacent the outputs from F1.0 and F2.0.

When an addition operation is to be performed, the terminals marked "Add" are energised with a positive potential, from the Add/Subtract selection circuit, and the terminals marked "Sub" are at zero with respect to the zero potential of the circuit. This means that gates G1 and G3 each has one of its controls energised in readiness for reception of a number from B storage.

As has already been stated, the two numbers are received from the A or B storages in synchronism, least significant digits being received first and each digit having an elemental time duration. At the centre of each time element representing a digit there is received from the pulse generator a P pulse. For the purpose of the present explanation it is assumed that the circuit is to perform the operation 7+5. These numbers will be received from the storage as 000111 (i.e. 7) and as 000101 (i.e. 5). In both cases the sign digit is assumed to occupy the sixth place and is 0 as the numbers are both positive.

It will be seen that both digits in the first digital place are ones, so leads A1 and N1 are energised. N1 being energised means that gates G1 and G2 open in series and lead B1 is energised. Inspection of the gates controlling F1 shows that, of the gates connected to the input of F1.1, only G7 can give an output since its controls B1 and C0 are both energised. However, this has no effect since it only allows one of the controls to G14 to be energised because A0 is not energised. Hence F1.1 is unaffected. Considering the gates controlling F1.0 shows that G9 has both its controls energised and so energised its output, which forms one control for G15. As the input lead A1 is energised G15 has two controls energised simultaneously and so delivers an output. This energises a control of G18, which therefore delivers an output to F1.0 when the P pulse for that digital place occurs. As F1.0 is already operated this has no effect, so F1 is left with F1.0 operated and its output D0 energised.

It is necessary now to consider the "carry" flip-flop F2. Gate G19 has all four of its controls energised when the P pulse occurs since A1 and B1 are both positive and F2.0 is operated and hence energising its output C0 via the waveform changer X2. Gate G19 therefore delivers an output pulse which operates F2.1 via G21. Therefore, F2.0 assumes its unoperated condition. The output from F2.1 is a sudden change of voltage to a positive level, and the rise of voltage is delayed by X1 so that it does not reach a value sufficient to operate a gate until after the P pulse ends. Hence the "carry" condition is generated—output C1 from X1 energised—in time for the next received pair of digits from A and B storages.

Thus the first pair of digits has left F1 set at F1.0 with its output D0 energised, and has set F2 to F2.1 with lead C1 effectively energised after a slight delay.

When the next pair of digits arrive, they energise leads A1 and N0 positively. The digit from B storage causes G3 to open as both of its controls are energised, which energises B0 via G4.

The computation for this digital place is 1+0+1 (from "carry") which gives an answer of 0 and carry 1. F1 will now be considered. The "carry" condition from the previous pair of digits leaves C1 energised, as described. Considering F1.0 first, it will be seen that G10 has both its controls energised, and as A1 is at positive, G15 and G18 operate in series. This finds F1 at F1.0, so has no effect. Of the gates controlling F1.1, G8 has both its controls energised but this is ineffective as A0 is at zero so that G14 cannot operate. Hence F1 remains at F1.0, leaving D0 energised again. Turning now to F2, it will be seen that neither G19 nor G20 has all controls energised and so again F2 if left at F2.1. Hence we have again given an answer, or "written" the answer, of 0 and carried 1.

For the third digital place both A1 and N1, and hence B1, are energised and C1 is energised by the "carry" as described. Considering the gates for F1.0, it will be seen that B1 and C1 cause G11 to deliver an output but this has no effect as A0 is not energised, so that G16 does not deliver an output. Turning to the gates for F1.1, it will be seen that G5 has both inputs energised from B1 and C1, and so delivers an output. As A1 is also energised, G13 delivers an output to G17. When the P pulse occurs, G17 therefore delivers an output to operate F1.1 and render F1.0 unoperated. This means that D1 is now energised, indicating that the answer has 1 in its third place.

It is necessary now to consider F2. Again neither G19 nor G20 has all controls energised, so F2 is unaffected and still indicates that one is to be carried.

In the next digital place, A0 and N0, and hence B0, are both energised, and C1 is energised. Therefore gates G10 and G8 both deliver outputs, but as A0 is energised, only G14 of the next stage of gates can deliver an output. The P pulse therefore causes G17 to deliver an output. As F1 is already at F1.1 this leaves it unaltered, with output D1 energised. G20 controlling F2.0 has all controls energised and so causes F2 to restore to F2.0 via G22. This removes the C1 output and energises C0 after the usual delay.

For the next, the fifth digital place, we have A0, B0 and C0 energised, so F1 and F2 are unaffected leaving D0 and C0 both energised.

The next digital place in the example being examined is the sign digit, and as both numbers are positive, A0 and B0 are both energised. With A0, B0 and C0 all energised it will be seen that F1 and F2 are not altered. Hence the answer is 001100, i.e. +12. This is clearly the correct answer. During the sign digit, the P$n$ pulse occurs and this restores F2 to F2.0 if not already there. As stated above, P$n$ always occurs at this point.

The action of the flip-flop F1 can be expressed briefly in that when one or three inputs to the equipment, considering "carry" as a third input, are energised, F1.1 operates or remains operated, and when no inputs or two inputs are energised, F2.0 operates or remains operated. Turning to F2, it will be seen that during addition this starts at F2.0, i.e. no "carry," and as soon as a "carry" is called for, indicated by A1 and B1 energised, it operates, and stays operated until no further "carry" is wanted. This will be shown by both A0 and B0 being energised, indicating that the digits then received are both at zero.

The operation $A+B$ when A and B are both positive is shown diagrammatically in Fig. 3$a$ for the addition 102+53. In Fig. 3 the sign digit is assumed to occur in the ninth digital place (i.e. $n=9$) and the numbers written "binarily" in Fig. 3 separate the sign digit from the rest of the number by a broken line although there is no such separation in fact. In view of the explanation already given Fig. 3$a$ can be followed easily. As seen, the answer is 010011011, which equals +155.

The output from F1 is supplied via two P pulse controlled gates G01 and G02 to the Results Storage, where the result is stored, either for future use in a further computation or for transmission to an output circuit.

*Addition of two negative numbers*

Where negative numbers are being handled they will be held in the storage devices A and B in their complemented forms, i.e. each negative number is held as a sign digit 1, followed by the binary complement of the number. If the information which was originally supplied to the computer included negative numbers, these numbers are normally complemented during the notation conversion which occurs during the supply of information to the computer. The information, as supplied, includes, with each number, an indication as to whether it is positive or negative. If it is positive, it is converted to binary notation and is recorded with a sign digit of 0, while if it is negative, it is converted to binary, complemented, and recorded with a sign digit 1. A negative number may also arise during the computation, as described hereinafter. This is commonplace computer technique and forms no part of the present invention.

It will again be assumed that the sign digit occupies the sixth place for this explanation. The sum to be performed is $(-7)+(-5)$. The numbers being negative they will be received from the storages on their complements with respect to $2^5$ (i.e. to 32). Hence they are received as 111001 and as 111011. In both cases the sixth digit is the sign digit. Once again the Add input is energised, and normal addition occurs. It will be seen that it gives as answer 110100. There will be an attempted "carry" from the seventh digital place, but this is ineffectual because there are only six digital places available. The last five digits of this answer may now be translated to 20 if decimal notation is the desired notation in a manner not shown and since 20 is the complement of 12, the answer means −12.

Fig. 3 shows at Fig. 3$c$ $(-A)+(-B)$ in this case being $(-102)+(-53)$. As before, in Fig. 3, the sign digit occupies the ninth digital place. The figure shows that the numbers are received, as described, as their complements, and normal addition occurs.

The only remaining addition operation is $(-A)+B$ or $A+(-B)$, and it is thought that no description of this is needed after the foregoing description and in view of the following description of subtraction.

*Subtraction of two binary numbers*

In this case we are doing the subtraction $A-B$. The controlling apparatus (not shown) energises the leads marked "Sub." Therefore, digits received on N1 pass via G24 and G4 to B0 and digits received on N0 pass via G23 and G2 to B1. Thence these gates serve to invert the number being received. Hence if the computation is 7−5, 5 is received at N1–N0 as 000101, and at B1–B0 as 111010. The control equipment also causes pulse S$p$ to occur as described when a subtraction is to be performed, which sets F2 at F2.1 before the numbers start to arrive. S$p$ is produced at the output of amplifier AMP2 when gate GP3 opens with counter CPG in position $x$ and the lead Sub energized. As already set out this gives the so-called "fugitive one."

The process now is the same as for normal addition, and the answer obtained is 000010, i.e. +2. The sign digit is 0 since there will be a carry from the previous digital place. If we had tried to do 5−7, −7 would appear at B1–B0 as 111000, and F2.1 would again be energized at the start. Normal addition gives 111110 as answer. This means −2.

Hence it will be seen that with normal subtraction the sign digit is to 0 in the answer if the result is positive and 1 if the result is negative. In the latter case the answer is the complement of the solution as usual.

Fig. 3$b$ shows $A-B$, i.e. 102−53, with the sign digit in the ninth place, and Fig. 3$d$ shows $(-A)-(-B)$, i.e. $(-102)-(-53)$. Neither of these require any further illustration.

All that remains now is to describe the detailed circuits shown in Fig. 2.

*Detailed circuit (Fig. 2)*

The two flip-flops are both of the bistable type, having their anodes capacitively coupled. When one tube of a flip-flop is caused to discharge at a time when the other tube is already discharging, the discharge in this other tube is extinguished.

The gates controlling the flip-flops are rectifier-coincidence gates. Gate GA will be described as a typical example. It consists of a lead including resistor R1 from a common point to a source of positive biassing potential, and leads including rectifiers MR1 to MR4 to four control points.

The potential of each control point can assume either one of two distinct values, one being at or near earth potential and the other being a positive potential. The rectifiers are so orientated as to be in the direction of easy conductivity for current flowing from the biassing source through R1 and through the rectifiers to the respective control points. Thus the effect of the rectifiers is to hold the common point, which is the output point of the circuit, at the potential of the least positive of the control points. When all control points assume their positive potentials, i.e. their effective potentials, simultaneously, the potential of the common point rises to a value substantially equal to that effective potential. Obviously if the effective values of the control point potentials differ the common point potential substantially equals the least positive of them.

When a control point assumes its positive value the rectifiers connected thereto are said to be biassed positively.

Only when all rectifiers of a gate circuit, i.e. all rectifiers which are connected to control points of that gate circuit, are biassed positively will the common point potential, and hence the output potential, assume a positive value.

Where several gates are connected to the same point it is necessary to include in the output lead of each gate a decoupling rectifier such as MR5 to prevent interaction between gates.

It will be seen that although in Fig. 1 there are shown three stages of gates for each tube of F1 these are represented in Fig. 2 by a single stage of gates. Clearly three stages of gates could be used as shown in Fig. 1 if this was preferable for any reason. The gate GA already described corresponds to G12, with the A0 and P controls of G16 and G18 respectively added. In Fig. 2 each of these gates is shown enclosed in a broken line box.

The common point of each group of gates is connected to earth via a resistor such as R2, which serves to discharge the self-capacitors of the rectifiers and to stabilise the potential of that point so that when all gates are closed the common points of the set of gates is not "floating." The common point of each set of gates is connected to the trigger electrode of its tube via a capacitor such as C1′, which passes the triggering pulses thereto. Standing bias for the tubes comes from a source B+ via resistors, said bias source being represented by a circle with a plus sign in it and the letter B alongside the circle. The source B+ supplies a lower potential than the main supply (indicated by a circle containing a plus sign) and cannot operate the tube unaided.

The flip-flop F2 is similar to F1, and its controlling gates need no comment except to point out that decoupling rectifiers MR6–MR7 and MR8–MR9 correspond to the "one" gates G22 and G21 respectively.

The cathode circuits of the flip-flop tubes of F2 are somewhat complex, so the cathode circuit of F2.0 will be fully described. The cathode goes to a negative supply point (represented by a circle with a minus sign in it) via resistor R3 and to earth via rectifier MR10.

The rectifier connection to earth ensures that the cathode potential can never fall negative to earth. When the tube conducts, current flow in R3 makes the cathode positive to earth, so MR10 is in its high resistance state and can be said to be blocked. Hence R3 is the effective cathode load. When the tube is extinguished, its cathode capacitor C2′ discharges rapidly via R3 to the highly negative potential until its potential reaches earth, when MR10 "catches" the cathode potential. Thus we obtain a rapid return of the cathode potential to zero.

The devices shown in Fig. 1 as waveform changers form the rest of the cathode circuits, and again that for F2.0, i.e. X2, will be described. They are really delay circuits to delay the rise in output level to cathode potential. The one attached to F2.0 comprises rectifier MR11, capacitor C3′, and a connection including resistor R4 to the positive supply. As has already been described, the cathode potential of F2.0 is at or near earth potential when that tube is quiescent. This means that C3′ is then substantially uncharged and the potential of the output lead C0 is at or near earth potential. When F2.0 is fired, however, its cathode voltage rises rapidly to a positive value, and as a result of this positive bias on MR11, C3′ charges via R4 until the potential on C0 is at or near that of the cathode of F2.0. Thus we have what may be termed a slow-rising output. The result of this is that the output C0 or C1 from an F2 tube does not reach an effective level during the P pulse which fired that tube. The components are such that the potential on C0 or C1 has reached a value at or near that of the cathode of the tube concerned in time for the next P pulse.

When F2.0 is discharging, and F2–1 is fired, F2.0 is cut-off, and its cathode potential falls relatively slowly as C2′ discharges. This means that C3′ discharges via MR11 and R3 at a corresponding rate, so that the circuit will also give what may be termed a slow-falling output when the tube concerned is extinguished. The curves of C1 and C0 in Fig. 3 clearly show these slow-rising and slow-falling outputs.

All that remains to be described is the circuit for inverting the number from B storage for a subtraction. Two cathode followers CFA and CFB are used, and each has an input gate controlled by the Add terminal and one controlled by the Sub terminal. Each of the leads N1 and N0 goes to a gate in each tube input. Each of these gates is given the reference of the corresponding gate in Fig. 1. G2 and G4 of Fig. 1 are represented by the cathode followers shown in Fig. 2. Each tube has its grid biased to the proper operating potential by connection through a resistor to a negative source represented by a circle enclosing a minus sign.

While the principles of the invention have been described above in connection with specific embodiments, and particular modifications thereof, it is to be clearly understood that this description is made only by way of example and not as a limitation on the scope of the invention.

What we claim is:

1. An electrical subtraction circuit comprising an adding circuit, said adding circuit comprising a first pair of channels over which signals representing a first number from which a second number is to be subtracted are received, a second pair of channels over which signals representing said second number are received, which numbers are expressed in binary digital code, the signals representing them being received digit by digit with the least significant digit first, the first channel of the pair being energized if the digit momently received over that pair of channels is "1" and the second channel of the pair being energized if the digit momently being received over that pair of channels is "0," a pair of output channels, gating means between said output channels and said receiving channels comprising groups of gates arranged in three cascaded stages, a two-condition device which is normally in its first condition, first control means responsive to the simultaneous energization of the first channels of both of said pairs of channels to cause said two-condition device to assume or remain in its second condition, means responsive to said two-condition device being in its second condition in response to the digits in one digital place to cause a signal representing "carry" to be produced for the next digital place of the numbers being added, second control means responsive to the simultaneous energization of the second channels of both of said pairs of channels to cause said two-condition device to return to or remain in its first condition, and means responsive to said two-condition device being in its first condition in response to the digit of one digital place to cause a signal representing "no carry" to be produced, whereby as soon as "carry" is required, said two condition device assumes its second condition in which it remains until the first subsequent digital place from which no carry is necessary, and means for causing the gates of said first stage of said gating means to respond to the simultaneous receipt of "carry" and "no carry" signals and said signal on said second pair of receiving channels, means for causing gates of said second stage to respond to the simultaneous receipt of signals from said first stage of gating means and signals from said first pair of receiving channels, and means for causing the gates of said third stage of said gating means to respond to the simultaneous receipt of signals from gates of said second stage, respective output circuits for said second pair of channels comprising conversion means connected to said second pair of channels responsive to an indication that subtraction is to be performed to convert all ones in said second number to zeros and all zeros in said second number into ones, the converted digits then being applied to the appropriate output circuits of said second pair of channels, and means responsive to said subtraction indication for initially setting said first two-condition device to its second condition in which the "carry" is caused to be produced for the first pair of digits of said numbers.

2. An electrical subtraction circuit, as claimed in claim 1, in which the conversion means comprises a pair of gates connected to each channel of the second pair, each of the gates connected to a single channel having outputs connected respectively to said output circuits, means for opening one gate of each pair and closing the other so as to connect said channels respectively to said output circuits, and means for reversing the operation of said gates so as to reverse the connection to said output circuits.

3. An add/subtract circuit comprising a first pair of channels over which signals representing a first number in binary digital code are received digit by digit, a second pair of channels over which signals representing a second number in binary digital code are received digit by digit, means for synchronizing the receipt of the digits over said pairs of channels, adding means including a two-position carry device for adding the digits as they appear on said pairs of channels, means responsive to a signal indicating that subtraction is required for complementing the digits of said second number as they are received over said second pair of channels, and means also responsive to said signal indicating that subtraction is to be performed for operating said two-position carry device for adding a "1" to the first digits added.

4. An add/subtraction circuit comprising a first pair of channels over which signals representing a first number are received, a second pair of channels over which signals representing a second number are received, which numbers are expressed in binary digital code, the signals representing them being received digit by digit with the least significant digit first, the first channel of the pair being energized if the digit momently being received over that pair of channels is "1" and the second channel of the pair being energized if the digit momently being received over that pair is "0," adding means for adding the digits received by said pairs of channels, a two-condition carry device which is normally in its first condition, first control means responsive to the simultaneous energization of the first channels of both of said pairs of channels to cause said two-condition device to assume or remain in its second condition, means responsive to said two-condition device being in its second condition in response to the digits of one digital place to cause a signal representing "carry" to be produced for the next digital place of the numbers being added, second control means responsive to the simultaneous energization of the second channels of both of said pairs of channels to cause said two condition device to return to or remain in its first condition, means responsive to said two-condition device being in its first condition in response to the digit of one digital place to cause a signal representing "no carry" to be produced, whereby as soon as "carry" is required, said two-condition device assumes its second condition in which it remains until the first subsequent digital place from which no carry is necessary, means in said adding means responsive to said "carry" and "no carry" signals from said two-condition carry device for altering the operation of said adding means to include the carry-over as requested, means responsive to a signal indicating that subtraction is to be performed for complementing the digits of the second input number as they appear on said second input channels, and means also responsive to a signal indicating that subtraction is to be performed for causing said two-condition carry device to assume its second condition, whereby a fugitive "1" is added.

References Cited in the file of this patent

UNITED STATES PATENTS

| | | |
|---|---|---|
| 2,590,950 | Eckert et al. | Apr. 1, 1952 |
| 2,609,143 | Stibitz | Sept. 2, 1952 |
| 2,643,820 | Williams | June 30, 1953 |
| 2,705,108 | Stone | Mar. 29, 1955 |
| 2,724,780 | Harris | Nov. 22, 1955 |
| 2,803,401 | Nelson | Aug. 20, 1957 |
| 2,823,855 | Nelson | Feb. 18, 1958 |

FOREIGN PATENTS

| | | |
|---|---|---|
| 1,034,099 | France | Apr. 8, 1953 |

OTHER REFERENCES

Williams et al.: "Universal High Speed Digital Computers: Serial Computing Circuits." Proceedings of Institute of Electrical Engineers. Part II, April 1952. Pages 111–113 relied on.

Hough et al.: "Cold Cathode Glow Discharge Tubes." Electronic Engineering. May 1952. Pages 230–235. Page 230 only is relied on.